US005329821A

United States Patent [19]
Birnbaum et al.

[11] Patent Number: 5,329,821
[45] Date of Patent: Jul. 19, 1994

[54] AUTORANGING SONIC FLOWMETER

[75] Inventors: Theodore N. Birnbaum, Tulsa; Ellis M. Zacharias, Jr., Broken Arrow, both of Okla.

[73] Assignee: Nusonics, Inc., Tulsa, Okla.

[21] Appl. No.: 880,887

[22] Filed: May 8, 1992

[51] Int. Cl.⁵ ............................................. G01F 1/00
[52] U.S. Cl. ............................. 73/861.28; 73/861.27
[58] Field of Search ............ 73/861.27, 861.28, 861.29

[56] References Cited
U.S. PATENT DOCUMENTS

| | | | |
|---|---|---|---|
| 3,720,105 | 3/1973 | Circulis | 73/194 A |
| 3,771,117 | 11/1973 | Shaffer et al. | 73/861.27 |
| 4,509,372 | 4/1985 | Mount | 73/861.28 |
| 4,515,021 | 5/1985 | Wallace et al. | 73/861.27 |
| 4,856,322 | 8/1989 | Smalling et al. | 73/40.5 A |
| 5,052,230 | 10/1991 | Lang et al. | 73/861.28 |

*Primary Examiner*—Richard E. Chilcot, Jr.
*Assistant Examiner*—R. Biegel
*Attorney, Agent, or Firm*—Head and Johnson

[57] ABSTRACT

A system for measuring the flow of a fluid in a pipe that is one of a plurality of different sizes. The system employs a pair of transducers mounted on the pipe in an upstream-downstream relationship, Each transducer is excited by one of a pair of oscillators to transmit a sonic signal though the fluid to the other transducer. Transit times of the sonic signals are measured. A microprocessing network computes the flow rate of the fluid based on the measured transit time in the pipe. The system has a signal transit time between transducers equal to the time elapse of N cycles of the frequency emitted by the oscillators. The value of N, as computed by a microprocessor, relates to the size of the pipe.

21 Claims, 4 Drawing Sheets

AUTORANGING SONIC FLOWMETER

BACKGROUND OF THE INVENTION

This invention relates generally to transit-time sonic flowmeters used to measure the flow of liquids in full pipes and more particularly concerns an autoranging flowmeter that automatically determines pipe inside diameter and uses the diameter value in calculations of flowrate.

A typical transit-time sonic flowmeter is described in U.S. Pat. No. 3,720,105, Acoustic Flowmeter, issued to Uldis Cirulis and is further described in an article by Ellis M. Zacharias and Donald W. Franz entitled "Sound Velocimeters Monitor Process Streams" published in the Jan. 22, 1973 issue of *Chemical Engineering* (pages 6-8 and FIG. 5 of article reprint).

In a typical sonic flowmeter two transducers are positioned so that they may communicate by alternately sending and receiving acoustic signals through the liquid that flows through the pipe. The transducers are so positioned that the line between them usually intersects the pipe axis at an angle of 45 degrees, but the angle may vary from 30 to 60 degrees, depending upon the circumstances. A small angle is desirable because it will result in better flow sensitivity. The transit time of an acoustic signal between transducers will depend on transducer spacing, the velocity of sound in the liquid and the rate of flow of the liquid. Thus, if the spacing and sound velocity are known, the rate of flow can be determined.

There are several problems inherent in the known acoustic flowmeter systems. For example, the transducers are generally recessed back from the inside wall of the pipe. Therefore, the time T it takes an acoustic signal to traverse the path from one transducer to the other includes the times through the non-flowing column of liquid in each recess as well as the time through the liquid flowing in the pipe $T_p$. Inaccuracy in compensating for these time components results in inaccuracy in the metering system. Another problem with known systems is that a different pair of transducers is generally dedicated to monitor each flow station, resulting in higher system costs. In addition, for very narrow pipes, problems ensue because the separation between transducer faces is minimal and the transit time is brief. When the transit time is brief, a transducer may assume the role of a receiver before it has become quiet following excitation as a transmitter and the self noise that results may create an error in the determination of arrival time of an acoustical signal from the opposing transducer. Finally, most systems require a relatively high voltage source because a low voltage excitation signal results in a proportionately smaller acoustic signal, which in turn decreases the signal-to-noise ratio at the receiving transducer, making it difficult to use the flowmeter on larger diameter pipes.

It is, therefore, an object of this invention to provide a sonic flowmeter which determines pipe size by measuring the transit time and subtracting out those components of transit time that are not pipe diameter dependent. It is a further object of this invention to provide a sonic flowmeter which contains acoustic windows that permit the transducers to be withdrawn and used elsewhere. It is also an object of this invention to provide a sonic flowmeter in which a single transmission is followed by a waiting period prior to an opposite transmission to reduce noise problems in the system, or, as an alternative, to provide a sonic flowmeter in which each transducer may transmit a succession of signals before reverting to the role of a receiver. And it is an object of this invention to provide a sonic flowmeter which generates a comparatively high (80 volts) transducer excitation from a low voltage (9 volt battery) source.

SUMMARY OF THE INVENTION

In accordance with the invention, a sonic flowmeter is provided which applies the converse of the normal flowmeter principle earlier cited and determines the transducer spacing by measuring transit time when the sound velocity is known.

The transducer used is well known to those skilled in the art. It employs suitable damping to minimize oscillations of the piezoelectric element following excitation. The transducer housing is designed to facilitate quick installation and removal. The face of each transducer has cemented to it a thin (0.03 inch) layer of solid rubber to serve as an acoustical couplant. This rubber facing insures that there will be no air trapped between the transducer and the window that, if present, would block the acoustic signals. Moreover, the rubber facing avoids the need of grease or oil couplants which are messy and inconvenient to handle. A threaded "retainer" is used to secure the transducer firmly against the window. The retainer is intended for quick installation and retrieving of the transducer.

Each acoustic window in the flowmeter contains an O-ring seal and is held in place by a window carrier. The window is sonically transparent so as not to attenuate the sonic signal excessively. Moreover, the window has sufficient mechanical strength to withstand liquid hydrostatic pressure over the entire temperature range, is chemically compatible with the metered liquid and has low creep characteristics. For example, the window material selected for use in heating ventilating and an conditioning (HVAC) applications is ULTEM, a product manufactured by the General Electric Company. However, there are other suitable materials and the scope of this invention is not limited to only ULTEM.

In this flowmeter, the propagation time between transducers is given by the expression:

$$T = T_p + 2T_w + 2T_d + T_e,$$

where $T_p = \frac{p}{c}$ where $p$ is the diagonal distance across the pipe and $c$ is the liquid sound velocity;

$T_w = \frac{w}{u}$ where $w$ is the acoustic window thickness and $(u)$ is the sound velocity in the window material;

$T_d = \frac{d}{c}$ where $d$ is the depth of the recessed liquid between the window and the pipe inside wall; and $T_e =$ all other delays lumped together, including time through the rubber acoustical couplant on the face of both transducers, as hereinafter described, and delay time in the electronics.

A microprocessor computes p from the above expression, using constants that are stored in memory for $T_w$ and $T_d$, and determines the pipe size for this value of p by comparing the value of p with the values in a group of several time ranges. Each time range defines a range of time values for each pipe size. A range is needed because the sound velocity in liquids will vary with temperature and with liquid composition. For example, the sound velocity will vary with the concentration of ethylene glycol antifreeze in water.

The flowmeter control circuit is designed so that a single transmission is followed by a waiting period, typically but not necessarily seven times the transit time between transducers, to allow the transmitting transducer to "quiet down" before it becomes a receiver. In another embodiment, the flowmeter control circuit may be designed so that a succession of n transmissions in one direction between transducers is followed by a succession in the opposite direction. This reduces the influence of self noise and improves the signal-to-noise ratio.

The circuit also uses the voltage surge that results when a current-carrying inductor is disconnected from the current source to provide a voltage surge during which a high amplitude voltage is applied to the transmitting transducer, thereby creating a proportionately greater acoustic signal. This greater signal output provides a better signal-to-noise ratio at the receiving transducer and makes it possible to use the flowmeter on larger diameter pipes.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

One preferred embodiment of the autoranging flowmeter can determine liquid flowrate in 14 differently sized flowtubes with known inner diameters and known transducer recess dimensions. The liquid can typically be water or a water-ethylene glycol mixture with up to a 50% concentration. The liquid temperature can vary typically from 4.0 to 90.0 degrees Celsius. The volumetric flowrate will be displayed via a 4 digit LCD display. The switch tells the flowmeter to which of two sets of flowtube sizes the subject flowtube 10 belongs, each set including 7 of the 14 different sizes. The flowmeter determines by itself all internal parameters and the pipe size being used. The internal parameters consist of an N factor, a blanking time and a threshold voltage. After the internal parameters are found, the flowmeter makes a measurement of the travel or transit time of an ultrasonic beam from one transducer to another. That transit time is then compared with previously calculated values for one set of seven different flowtube sizes to find the subject flowtube size. The flowtube size is displayed momentarily and then the meter commences to measure and display flowrate.

Figure 1:
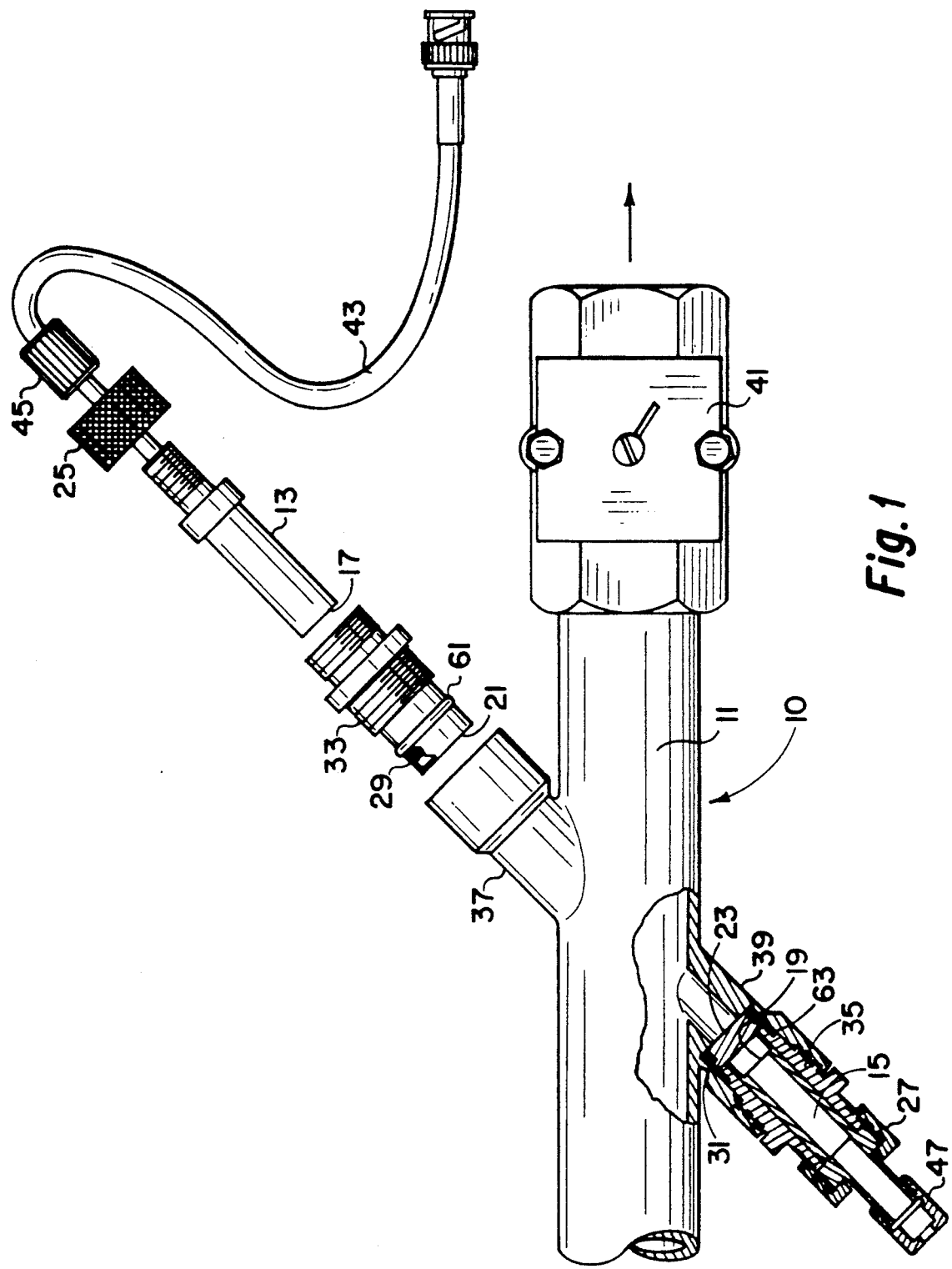
FIG. 1 is a front elevation view of a transducer pipe section which is a part of the sonic flowmeter of the invention.

Looking at FIG. 1, an ultrasonic beam is directed through the liquid at an angle $\theta$, preferably 45 degrees, with respect to the axis 11 of the flowtube 10. Ultrasonic pulses are transmitted in both directions, that is from the upstream transducer 15 to the downstream transducer 13 and vice versa. If the flowrate is non-zero, the transit times in the two directions will differ and so will the associated frequencies Fa and Fb of the pulse in each direction. The difference between Fa and Fb is used to determine a linear liquid flowrate in inches/second. The cross sectional area of the flowtube 10, determined from the flowtube inner diameter, is then multiplied by the linear liquid flowrate to determine the volumetric flowrate typically in gallons/minute or liters/minute.

The design of the transducers 13 and 15 is well known to those skilled in the art. It employs suitable damping to minimize oscillations of the piezoelectric element following excitation. The transducer housing is designed to facilitate quick installation and removal. The face of each transducer 13 and 15 has cemented to it a thin (0.03 inch) layer of solid rubber 17 and 19 to serve as an acoustical couplant. The rubber facings insure that there will be no air trapped between the transducers 13 and 15 and the windows 21 and 23 that, if present, would block the acoustic signals. Moreover, the rubber facings 17 and 19 avoid the need of grease or oil couplants which are messy and inconvenient to handle. A threaded "retainer" 25 or 27 is used to secure each transducer 13 or 15 firmly against its window 21 or 23. The retainers 25 and 27 are intended for quick installation and retrieving of the transducers 13 and 15.

Each acoustic window 21 or 23 in the flowmeter 10 contains an O-ring seal 29 or 31 and is held in place by a window carrier 33 or 35. The windows 21 and 23 are sonically transparent so as not to attenuate the sonic signal excessively. Moreover, the windows 21 and 23 have sufficient mechanical strength to withstand liquid hydrostatic pressure over the entire temperature range, are chemically compatible with the metered liquid and have low creep characteristics. For example, the window material selected for use in HVAC applications is ULTEM, a product manufactured by the General Electric Company. However, there are other suitable materials and the scope of this invention is not limited to only ULTEM.

The above described transducer assemblies are mounted on sleeves 37 and 39 extending at the angle $\iota$ from opposite sides of the flow tube 10. The connections between the sleeves 37 and 39 and the carriers 33 and 35 are sealed by O-rings 61 and 63. Flow through the flow tube 10 is controlled by a screw adjust valve 41. Each transducer 13 and 15 is connected to the flowmeter control circuit and microcomputer by cables 43 via strain relief connectors 45 and 47.

In this flowmeter, the propagation time between the transducers 13 and 15 is given by the expression:

$$T = T_p + 2T_w + 2T_d + T_e,$$

where $T_p = \frac{p}{c}$ where $p$ is the diagonal distance across the pipe 10 and $c$ is the liquid sound velocity;

$T_w = \frac{w}{u}$ where $w$ is the acoustic window 21 or 23 thickness and $(u)$ is the sound velocity in the window material;

$T_d = \frac{d}{c}$ where $d$ is the depth of the recessed liquid between the window 21 or 23 and inside wall of the pipe 10; and $T_e =$ all other delays lumped together, including time through the rubber acoustical couplant 17 or 19 on the face of both transducers 13 and 15 as hereinafter described, and delay time in the electronics.

Figure 4:
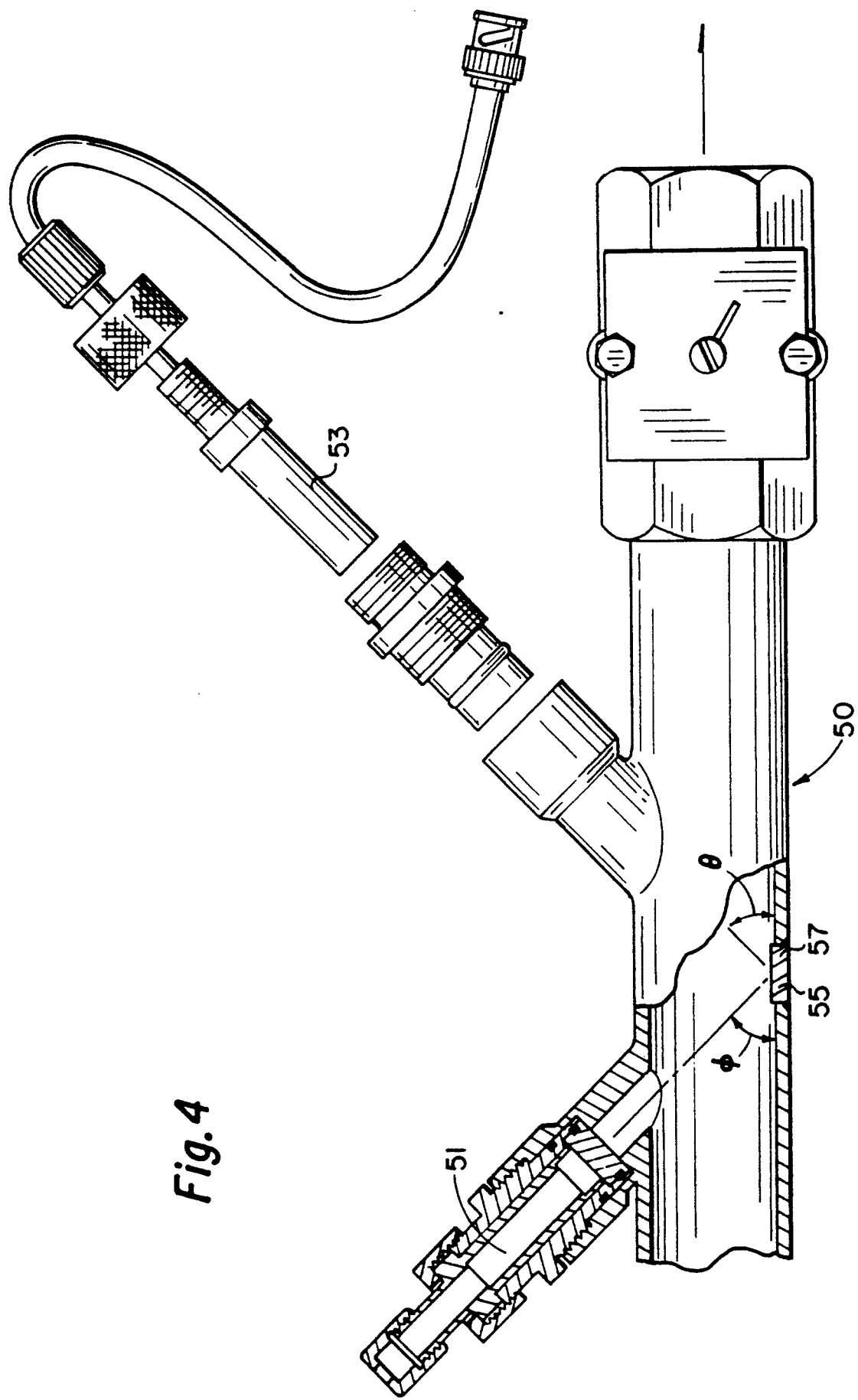
FIG. 4 is a front elevation view of another embodiment of a transducer pipe section which is a part of the sonic flowmeter of the invention.

Another embodiment of the transducer pipe section forming a part of the present sonic flowmeter is illustrated in FIG. 4. As shown, the flow tube 50 is in all respects the same as the flow tube 10 illustrated in FIG. 1 except that the upstream transducer 51 is disposed on the same side of the pipe as the downstream transducer 53 on an axis disposed at a reflective angle $\phi$ equal to the angle of incidence $\theta$ between the longitudinal axis of the pipe and the axis of the downstream transducer 53. The angle of incidence $\theta$ is reflected from a substantially flat surface 55 on or proximate the pipe interior wall surface opposite the transducers 51 and 53. For relatively narrow pipes the reflective focal surface 55 may be the interior flat surface of a plug 57 inserted in the pipe. For relatively large diameter pipes, the plug 57 need not be used, because the curvature of the pipe will not be so severe so as to significantly affect the reflective angle of the signal. One of the advantages of this embodiment is that the transit time of the signal in the fluid is approximately doubled without significant change in the transit time in other regions between the transducers. This reduces the impact of non pipe flow components of flow meter data and therefore increases the accuracy of the flowmeter.

Figure 2:
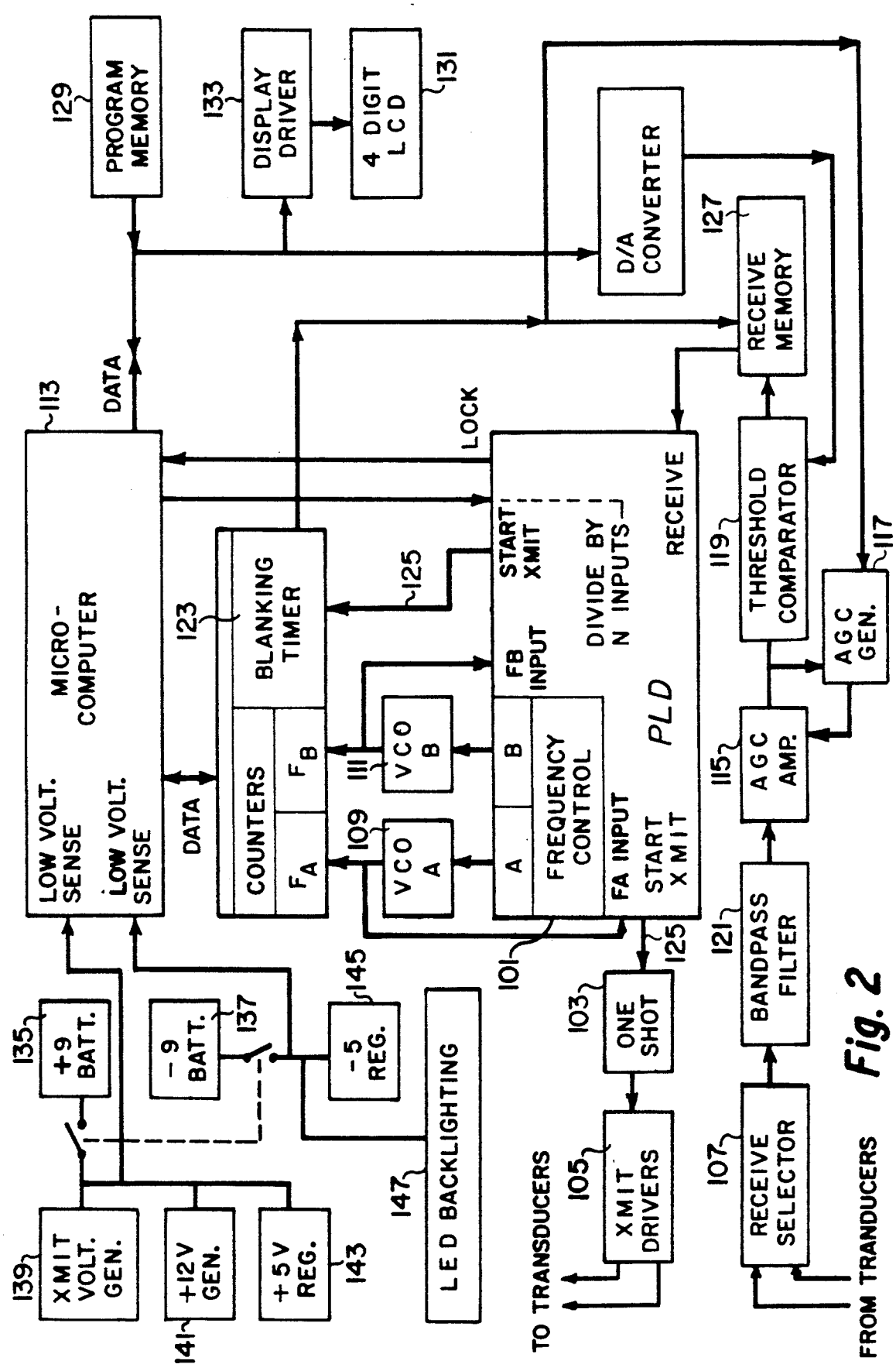
FIG. 2 is a block diagram of the sonic flowmeter of the invention.

A microprocessor illustrated in FIG. 2 computes p from the above expression, using constants that are stored in memory for $T_w$ and $T_d$, and determines the pipe size for this value of p by comparing the value of p with the values in a group of several time ranges. Each time range defines a range of time values for each pipe size. A range is needed because the sound velocity in liquids will vary with temperature and with liquid composition. For example, the sound velocity will vary with the concentration of ethylene glycol antifreeze in water.

Looking at FIG. 2, during operation, the flowmeter programmable logic device 101 triggers a one shot 103 which in turn triggers a transmit driver 105 to deliver a voltage pulse to the transmitting transducer 13 or 15 which converts it to an acoustic pulse. The acoustic pulse travels from the transmitting transducer 13 or 15, through the window 21 or 23, through the liquid and through the other window 23 or 21 to the receiving transducer 15 or 13. The receiving transducer 15 or 13 then converts the acoustic signal back to an electrical one which is received at the receive selector 107. After a suitable time, this process is repeated, except that the roles of the transducers 13 and 15 are reversed so that the sound travels in the opposite direction. The delay time is typically in the order of seven times the transit time between transducers 13 and 15, but may be any other convenient time. The greater the delay, the less impact transducer self-noise will have on the system. However, greater delays also result in slower flowmeter response. When the flowmeter is operating properly it is said to be in the lock condition. During lock, the time period from transmit to receive is exactly equal to N cycles of a frequency that is emitted from a pair of voltage controlled oscillators VCO. There are two VCO's 109 and 111, one for one sound direction and one for the other. The oscillators 109 and 111 are always running and are independent of the microcomputer 113. Their frequency outputs go to the programmable logic device 101 which in turn always generates a start transmit signal 125. The time interval from one start transmit signal 125 to another is dependent upon the frequencies Fa and Fb and the N factor information provided by the microcomputer 113.

The flowtube sizes range from 0.5 inches to 24 inches. The transmit to receive time period will show a similar variation with pipe size. Because the frequency range of the VCO's 109 and 111 is limited, one value of N cannot be used for all flowtube sizes. The microcomputer 113 located inside the flowmeter must find a value of N that is compatible with the flowtube size. The meter starts off with a large N value that corresponds to the largest flowtube. The flowmeter circuitry automatically pushes the frequency up or down as needed to cause N cycles of that frequency to have the same time span as the transmit-to-receive time period. If the frequency range is inadequate for that task, then the frequency will go to its high or low limit value, whichever is closest to the needed frequency. The microcomputer 113 changes N whenever a limit frequency is reached so as to allow the frequency to remain in limit. For example, if the pipe size is really 3 inches and not the largest one that is assumed at the outset, then the frequency will initially be driven to its high limit. When that occurs, the microcomputer will halve the value of N. This may happen repeatedly until the lock condition is reached and the frequency is within limits. The value of N is then stored and used forever more.

Figure 3A:
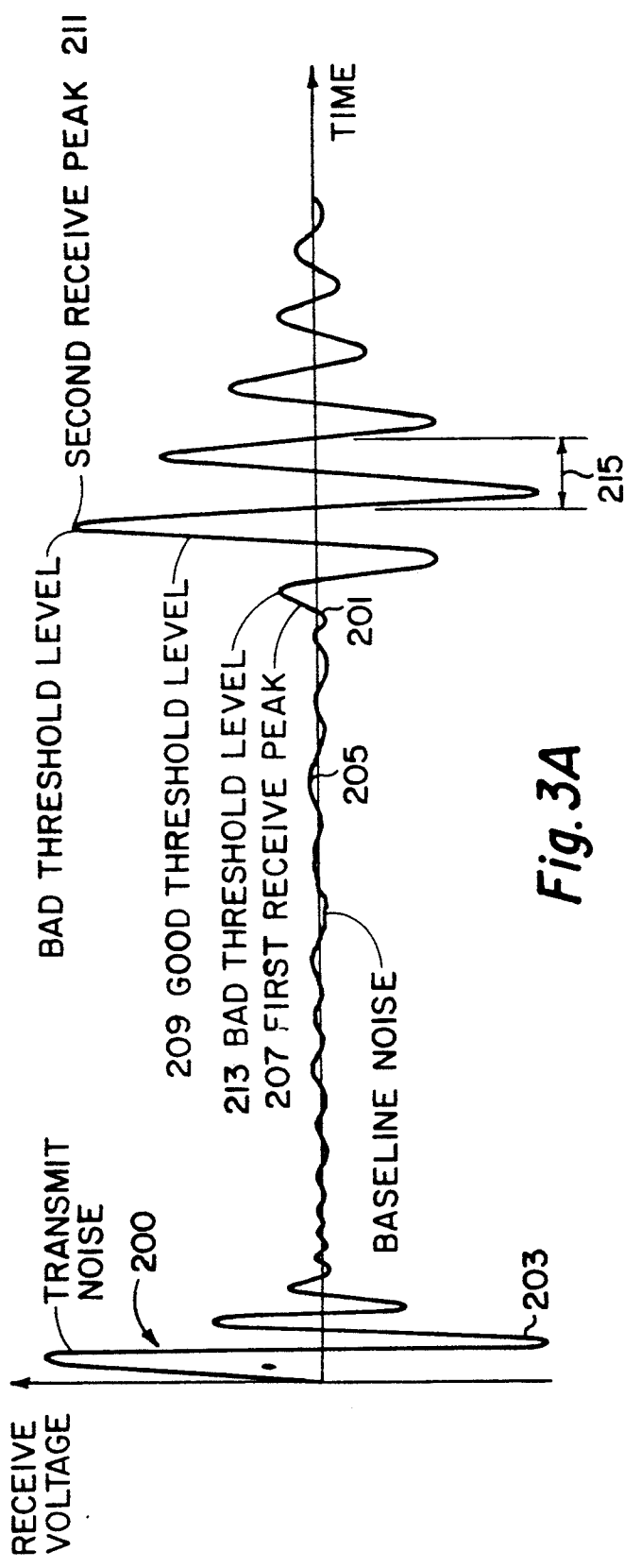
FIG. 3a, 3b is a timing diagram of the sonic flowmeter of FIG. 2.
Figure 3B:
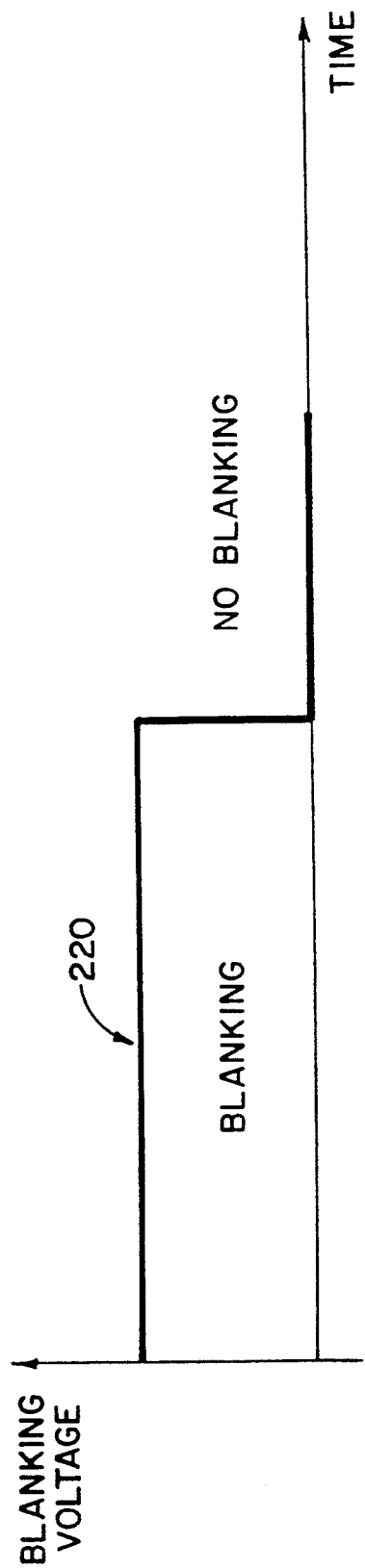

Turning to FIG. 3a and 3b, the receive circuitry on the flowmeter looks at the electrical signal 200 coming from a receiving transducer 13 and 15 and tries to determine the exact moment 201 that the receiving transducer 13 or 15 is excited by an incoming acoustic pulse. Prior to that moment, the signal 200 will be near zero and have little variation. When the pulse arrives, the signal 200 will have a sinusoidal variation, the amplitude of which builds up rapidly and then decays gradually. The frequency and time period of that sinusoid is known from the transducer type and is used to set the parameter of the bandpass filter 121 which passes the signal to an automatic gain control amplifier 115 controlled by the automatic gain control generator 117. A threshold comparator 119 then compares the signal with a large positive threshold value. When the threshold value is exceeded, the receive signal is deemed to have occurred. However, immediately following transmission, the signal 200 will also have large sinusoidal variations 203. The receive circuitry could be confused by these variations 203 if it were not disabled by a blanking signal 220. A blanking timer 123, in response to the start transmit signal 125, immediately generates a blanking signal 220. The blanking signal 220 will disable the receive circuitry for a blanking time period following transmission. Of course, the blanking time must be smaller than the expected receive time. It is desirable to utilize the maximum possible blanking time, so as to block any extraneous signals which may occur from time to time. The duration of the blanking signal 220 is constant during normal operation and has a value determined by the microcomputer 113. The microcomputer 113, after getting a rough measurement of the receive time, will typically set the blanking period to that value minus 7 microseconds. During the blanking signal 220, a receive memory device 127 is prevented from setting its output and the automatic gain control generator 117 is unaffected by the receive waveform at the output of the automatic gain control amplifier 115. When the blanking signal 220 ends, if that same receive waveform rises above a certain threshold set by the microcomputer 113, the output of the receive memory device 127 will be set. The programmable logic device 101 responds to any timing deviation between the setting of the output of the receive memory device 127 and the N factor requirements by directing the oscillators 109 or 111 to increase or decrease in frequency. The receive selector 107 uses signals coming from the programmable logic device 101 to select the source of the receive signal.

The optimum choice of threshold value is essential for the flowmeter to remain steadily in lock. If the value is chosen too low, the receive circuitry will be confused by small extraneous signals or noise 205 that ride intermittently on the signal baseline prior to true receive. The circuitry is configured so that only the first interception of the receive signal by the threshold value is relevant. The amplitude of the first receive sinusoidal cycle 207 is usually too small and will not cause a reliable interception. The cycles that follow, up to the one with maximum amplitude, will be candidates. The first interception 209 of a cycle will occur on its rising slope and must be midway between its positive peak value 211 and the positive peak value 213 of the preceding cycle 207. To find the proper threshold level, the microcomputer 113 must find the space or voltage 215 between adjacent positive peaks. It can do this because a threshold setting corresponding to a peak level will be identified by out of lock condition. Different pairs of adjacent cycles will have different spaces between their positive peaks. The pair with the most space must be chosen in order to obtain the maximum noise immunity. The microcomputer 113 searches for the optimum threshold value all the way from the maximum threshold setting down to 50 millivolts.

After setting the optimum threshold value, the microcomputer 113 finds how many receive cycles precede that optimum value. It does this by lowering the threshold and measuring the receive time. For example, in the case illustrated in FIG. 3, the receive time associated with the first cycle 207 will be about 640 nanoseconds less than the receive time associated with the intercepted cycle 209. This time difference is a characteristic of the transducer. Thus, the threshold is reduced until the receive time is diminished by 640 nanoseconds. At that point, a valid receive cycle is deemed to have been located. This process is repeated from the valid receive cycle until the threshold either goes to zero or the decrease in receive time is greater than 640 nanoseconds, as in the case of noise 205. The number of cycles found is multiplied by 640 nanoseconds and the result becomes part of a receive detect delay.

While the optimum threshold was set, the microcomputer 113 measured the receive time in both directions. It took the average value so as to remove the influence of flow velocity. The receiving detect delay was subtracted from the average value and the result was stored for later use. That result may be considered equivalent to the ideal no flow time. The ideal no flow time is the receive time that would be found if the liquid flow rate was zero and the electronics did not add any of its own delays to measurement of receive time.

The ideal no flow time is now compared with an appropriate table of numbers embedded in the microprocessor software code. The appropriate table of numbers is one of two and corresponds to the pipe set that was selected by the two position switch. For each pipe size there is a number in the table related to the maximum and minimum receive time. For example, the maximum time might occur with pure water at 4.4 degrees C., providing a minimum sound velocity, and the minimum time with 50% ethylene glycol also at 4.4 degrees C., providing a maximum sound velocity. The number equals the average of the maximum time for a pipe and the minimum time for the next larger pipe in the set. The ratio between any two pipe sizes is such that the maximum time for the smaller pipe is significantly less than the minimum time for the larger pipe. The microcomputer 113 compares the ideal no flow time with a number from the table, starting with the smallest pipe in the set. If the ideal no flow time is smaller than that number, then the microcomputer 113 deems that the flowtube size associated with the number is the correct size. If not smaller, then the microcomputer 113 compares the next number, which corresponds to the next larger size flowtube. The process continues until the microcomputer 113 finds the desired comparison.

The microcomputer 113, typically aided by an 82C54 timing integrated circuit (not shown), measures the value of frequencies Fa and Fb. From these frequencies and data stored in a program memory 129, the microcomputer 113 can determine the flowrate. The microcomputer then sends the flow rate data to a 4 digit LCD 131 via a display driver 133.

Power for all these activities are provided by two +9 volt batteries 135 and one −9 volt battery 137. The +9 voltage is converted by a transmit voltage generator 139 which includes a switching regulator and works synchronously with the start transmit signal 125 to about 80 volts for use by the transmit voltage supply. The synchronous activity of the switching regulator of the generator 139 reduces harmful noise feedthrough to the receive signal. Another switching regulator in a +12 volt generator 141 converts +9 to +12 volts for use by the analog circuitry. The plus 143 and minus 145 five volt regulators are linear. LED backlighting 147 for the LCD 131 is provided by the −9 volt battery 137 via a dropping resistor (not shown).

Given the present disclosure, specific systems to be used in the operation of the flowmeter may be exemplified by any of a variety of programs as may be developed by those of ordinary skill in the computer programming art.

Thus, it is apparent that there has been provided, in accordance with the invention, an autoranging sonic flowmeter that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use with a system for measuring the flow of a fluid in a pipe wherein a pair of transducers is mounted on the pipe in an upstream-downstream relationship, each transducer being excited by one of a pair of oscillators to transmit a sonic signal through said fluid in said pipe to the other of said transducers, the improvement comprising:

a pair of transducer mounting sleeves extending outwardly from said pipe providing communication with the interior of said pipe;

a pair of acoustic window means, one disposed in each of said sleeves for hydraulically isolating said transducers from said fluid in said pipe for passing said transducer sonic signals through said pipe; and a microprocessing network adapted for measuring the flow of said fluid of said pipe selected from a plurality of pipe sizes, each pipe size having a different inner diameter, said system having a signal transit time between transducers exactly equal to the time elapse of N cycles of a frequency emitted by said oscillators, wherein the value of N is computed by the microprocessor from transmit time data and relates to the size of the pipe.

2. The improvement of claim 1 further comprising:
means for sequentially selecting among the possible values of N in response to one of said oscillators reaching a frequency limit thereof;
means for automatically varying the frequency emitted by each of said oscillators over the range thereof until either:
the duration of, the time elapse of a selected N cycles of said emitted frequency exactly matches said transit time; or
the frequency emitted by said oscillator reaches an upper or lower limit, whichever first occurs; and
means for storing the selected value of N at which said emitted frequency exactly matches said transit time.

3. The improvement of claim 1, said system further comprising a microprocessor network having means for generating a threshhold signal of a variable level, means for selecting a level of said threshhold signal, means for receiving electrical output signals from each of said transducers operating as receivers and means for comparing said received output signals with said selected threshhold level to determine the moment said transducer is excited by an incoming acoustic pulse.

4. The improvement of claim 3, said system further comprising means for generating a blanking signal having means for initiating said blanking signal upon transmission of an acoustic signal by one of said transducers operating as a transmitter and means for terminating said blanking signal at a time less than said transit time and means responsive to said blanking signal for disabling said receiving and comparing means.

5. The improvement of claim 3, said receiving means further comprising means for filtering said electrical output signals and passing that portion of said signal having a maximum sinusoidal peak.

6. The improvement of claim 5, said selected threshold level being at approximately the level of a midpoint between a positive peak level of said maximum sinusoidal peak and a positive peak level of its immediately preceding cycle.

7. The improvement of claim 6, said selected threshhold level being not less than 50 millivolts.

8. The improvement of claim 6 further comprising means for counting the number of cycles of said transmit signal which precede said maximum sinusoidal peak.

9. The improvement of claim 8 further comprising means for multiplying said number of cycles counted by said counting means by approximately the average time of a cycle to determine a delay time.

10. The improvement of claim 9, said average time being approximately 640 nanoseconds.

11. The improvement of claim 8, said counting means comprising means for sequentially lowering said selected threshhold level whereby said comparing means detects a midpoint of each cycle preceding said maximum sinusoidal peak.

12. The improvement of claim 9 further comprising means for determining an average transit time of said transducer sonic signals in both directions between said transducers and means for subtracting said delay time from said average transit time to determine an ideal no flow time.

13. The improvement of claim 12, said microprocessor having a set of numbers stored therein, said numbers sequentially corresponding to an average of the maximum transit time of any of said pipes and the minimum transit time of the next sequentially larger pipe, said microprocessor having means for sequentially comparing said ideal no flow time with each of said set of numbers until the size of said selected pipe is determined.

14. For use with a system for measuring the flow of a fluid in a pipe wherein a pair of transducers is mounted on the pipe in an upstream-downstream relationship, each transducer being alternately excited by one of a pair of oscillator to transmit a sonic signal through said fluid in said pipe to the other of said transducers, the improvement comprising:

a pair of transducer mounting sleeves extending outwardly from said pipe providing communication with the interior of said pipe;

a pair of acoustic window means, one disposed in each of said sleeves for hydraulically isolating said transducers from said fluid in said pipe and for passing said transducer sonic signals through said pipe;

a microprocessor network having means for generating a threshold signal of variable level;

means for selecting a level of said threshold signal;

means for receiving electrical output signals from each of said transducers operating as receivers;

means for comparing said received output signals with said selected threshold level to determine the moment said transducer is excited by an incoming acoustic pulse;

means for filtering said electrical output signals and selecting the optimal sinusoidal peak, said selected threshold level being at approximately the level of a midpoint between a positive peak level of said optimal sinusoidal peak and a positive peak level of its immediately preceding cycle;

means for counting the number of cycles of said transmit signal which precede said optimal sinusoidal peak;

means for multiplying said number of cycles counted by said counting means by approximately the average time of a cycle to determine a delay time; and means for determining an average transit time of said transducer sonic signals in both directions between said transducers and means for subtracting said delay time from said average transit time to determine an ideal no flow time that is employed in said microprocessor network for determining the rate of flow of said fluid in said pipe, wherein said microprocessing network is adapted for measuring the flow of fluid in a pipe selected from a plurality of pipe sizes, each pipe size having a different inner diameter, said system having a signal transit time between transducers exactly equal to the time elapse of N cycles of a frequency emitted by said oscillators, wherein the value of N is computed by the microprocessor from transmit time data and relates to the size of the pipe.

15. The improvement of claim 14 further comprising:

means for sequentially selecting among the possible values of N in response to one of said oscillators reaching a frequency limit thereof;

means for automatically varying the frequency emitted by each of said oscillators over the range thereof until either:

(a) the duration of the time elapse of a selected N cycles of said emitted frequency exactly matches said transmit time, or (b) the frequency emitted by said oscillator reaches an upper or lower limit, whichever first occurs; and means for storing the selected value of N at which said emitted frequency exactly matches said transit time.

16. The improvement of claim 14 wherein said system further comprising means for generating a blanking signal having means for initiating said blanking signal upon transmission of an acoustic signal by one of said transducers operating as a transmitter and means for terminating said blanking signal at a time less than said transit time and means responsive to said blanking signal for disabling said receiving and comparing means.

17. The improvement of claim 14 wherein said selected threshold level is not less than 50 millivolts.

18. The improvement of claim 14 wherein said average time of a cycle is approximately 640 nanoseconds.

19. The improvement of claim 14 wherein said counting means comprising means for sequentially lowering said selecting threshold level whereby said comparing means detects a midpoint of each cycle preceding said optimal sinusoidal peak.

20. The improvement of claim 14 wherein said microprocessor network has a set of numbers stored therein, said numbers sequentially corresponding to an average of the maximum transit time of any of said pipe sizes and the minimum transit time of the next sequentially larger pipe size, said microprocessor network having means for sequentially comparing said ideal no flow time with each of said set of numbers and until the size of said selected pipe is determined.

21. The improvement of claim 14 wherein said optimal sinusoidal peak is selected on the basis that its positive peak level is higher than the positive peak level of the peak that precedes it and that the amount by which it is higher is greater than if any other peak had been selected as said optimal peak.

* * * * *